(12) United States Patent
DeWitt (10) Patent No.: US 8,706,358 B2
(45) Date of Patent: Apr. 22, 2014

(54) METHOD OF CONTROLLING BRAKING IN A VEHICLE

(75) Inventor: David S. DeWitt, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/278,470

(22) Filed: Oct. 21, 2011

(65) Prior Publication Data

US 2013/0103267 A1     Apr. 25, 2013

(51) Int. Cl.
*B60T 13/58* (2006.01)
*B60W 10/04* (2006.01)

(52) U.S. Cl.
USPC ............ 701/47; 701/50; 701/92; 701/97; 303/113.3; 303/115.4; 303/155; 303/177; 303/191; 180/197

(58) Field of Classification Search
USPC ............ 303/115.4, 119.2, 155, 187, 191; 701/78
See application file for complete search history.

(56) References Cited

U.S. PATENT DOCUMENTS

| | | | | |
|---|---|---|---|---|
| 2,613,549 | A * | 10/1952 | Thurber | 477/69 |
| 5,115,162 | A * | 5/1992 | Leonard et al. | 310/339 |
| 5,263,448 | A | 11/1993 | Bluhm et al. | |
| 5,333,944 | A | 8/1994 | Shirai et al. | |
| 5,709,438 | A | 1/1998 | Isakson et al. | |
| 5,779,329 | A * | 7/1998 | Takeshima | 303/155 |
| 6,871,916 | B2 | 3/2005 | Stephane et al. | |
| 7,229,138 | B2 * | 6/2007 | Nakamura et al. | 303/119.2 |
| 7,290,840 | B2 * | 11/2007 | Tsunehara et al. | 303/11 |
| 7,311,163 | B2 * | 12/2007 | Oliver | 180/165 |
| 7,543,896 | B2 * | 6/2009 | Ariki et al. | 303/115.4 |
| 7,604,303 | B2 * | 10/2009 | Cole et al. | 303/191 |
| 2002/0153771 | A1 * | 10/2002 | Obuchi | 303/155 |
| 2004/0108769 | A1 * | 6/2004 | Marathe | 303/2 |
| 2006/0163942 | A1 * | 7/2006 | Tsunehara et al. | 303/155 |
| 2007/0029875 | A1 * | 2/2007 | Kurosaki et al. | 303/187 |
| 2007/0216222 | A1 * | 9/2007 | Miyazaki et al. | 303/155 |
| 2008/0036291 | A1 * | 2/2008 | Sakai | 303/11 |
| 2008/0169699 | A1 | 7/2008 | Cole et al. | |
| 2009/0045672 | A1 * | 2/2009 | Nishino et al. | 303/113.3 |
| 2011/0132702 | A1 * | 6/2011 | Epple | 188/106 P |
| 2013/0103267 | A1 * | 4/2013 | Dewitt | 701/50 |

FOREIGN PATENT DOCUMENTS

| | | |
|---|---|---|
| CN | 103057539 | 4/2013 |
| DE | 19510525 | 9/1996 |
| DE | 19907338 | 5/2000 |

(Continued)

OTHER PUBLICATIONS

Extended European Search Report dated Mar. 25, 2013 in European Patent Application No. 12 18 9238.

(Continued)

*Primary Examiner* — Thomas Black
*Assistant Examiner* — Wae Louie
(74) *Attorney, Agent, or Firm* — Plumsea Law Group, LLC; Mark E. Duell (57) ABSTRACT

A braking control system includes sensors for detecting pressure applied to a brake pedal. The system can also include a pressure sensor capable of detecting the hydraulic pressure of the braking system. The system can also include a position sensor for detecting a position of the brake pedal. The pressure applied to the brake pedal is compared to either the hydraulic pressure or the pedal position. If the resulting measurements are not correlated properly, braking countermeasures are applied. Braking countermeasures can include engine braking, regenerative braking, hydraulic assist, and brake pad assist.

23 Claims, 8 Drawing Sheets

(56) References Cited

FOREIGN PATENT DOCUMENTS

| | | |
|---|---|---|
| DE | 19929959 | 1/2001 |
| DE | 10141547 | 6/2002 |
| DE | 102004012674 | 8/2005 |
| DE | 102007027876 | 4/2008 |
| DE | 102009001378 | 9/2010 |
| EP | 1394007 | 3/2004 |
| EP | 1834853 | 9/2007 |
| EP | 2583871 | 4/2013 |
| JP | 2006329380 | 12/2006 |
| JP | 2007038698 | 2/2007 |
| JP | 2007055583 | 3/2007 |
| JP | 2007245885 | 9/2007 |
| WO | 0185513 | 11/2001 |
| WO | 2007012948 | 2/2007 |

OTHER PUBLICATIONS

Japanese Office Action mailed Jun. 4, 2013 in Japanese Patent Application No. 2012-231557 and English translation thereof.
European Patent Office Communication dated Apr. 29, 2013 in European Patent Application No. 12189238.4.
European Office Action dated Nov. 25, 2013 in European Patent Application 12189238.4.
Japanese Office Action mailed Dec. 3, 2013 in Japanese Patent Application No. 2012-231557 and English translation thereof.

\* cited by examiner

METHOD OF CONTROLLING BRAKING IN A VEHICLE

BACKGROUND

The embodiments relate to motor vehicles and in particular to a method of controlling braking in a motor vehicle.

Vehicle braking systems have been previously proposed. Braking systems typically comprise brake pads that are operated using hydraulic pressure. The hydraulic pressure may be controlled manually through a brake pedal, which further connects to a booster, a master cylinder and a combination valve. For a properly functioning brake system, the force applied at the brake pedal is transmitted through the braking system to the brake pads. The force applied by the brake pads may be correlated, but not equal to, the force applied at the brake pedal. However, under some circumstances, the force applied at the brake pedal may not be properly correlated with the force applied by the brake pads. This could occur, for example, if the motion of the brake pedal is obstructed.

SUMMARY

In some embodiments, a method of controlling braking in a motor vehicle includes receiving information related to the hydraulic pressure of a portion of a braking system and receiving information related to the pressure applied to a surface of a brake pedal. The method also includes determining a measured braking relationship between the hydraulic pressure of the braking system and the surface of the brake pedal and retrieving a predetermined braking relationship, where the predetermined braking relationship comprises a predetermined correlation between the hydraulic pressure of the braking system and the pressure applied to the surface of the brake pedal. The method also includes comparing the measured braking relationship and predetermined braking relationship activating a braking countermeasure when the measured braking relationship is substantially different from the predetermined braking relationship, such that the braking countermeasure is configured to reduce a speed of the motor vehicle.

In some embodiments, a method of controlling braking in a motor vehicle includes receiving information related to the position of a brake pedal and receiving information related to the pressure applied to a surface of the brake pedal. The method also includes determining a measured braking relationship between the position of the brake pedal and the pressure applied to the surface of the brake pedal and retrieving a predetermined braking relationship, where the predetermined braking relationship comprises a predetermined correlation between the position of the brake pedal and the pressure applied to the surface of the brake pedal. The method further includes comparing the measured braking relationship and predetermined braking relationship and activating a braking countermeasure when the measured braking relationship is substantially different from the predetermined braking relationship, such that the braking countermeasure is configured to reduce a speed of the motor vehicle.

In some embodiments, a method of controlling a braking system in a motor vehicle includes sensing a pressure applied to a brake pedal surface and receiving information related to the amount of braking force applied by a braking system. The method also includes determining if the pressure applied at the brake pedal surface agrees with the amount of force applied by the braking system. The method further includes applying a braking countermeasure if the pressure applied at the brake pedal does not agree with the amount of force applied by the braking system.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

Embodiments of the invention can be better understood with reference to the following drawings and description. The components in the figures are not necessarily to scale, emphasis instead being placed upon illustrating the principles of embodiments of the invention. Moreover, in the figures, like reference numerals designate corresponding parts throughout the different views.

DETAILED DESCRIPTION

Figure 1:
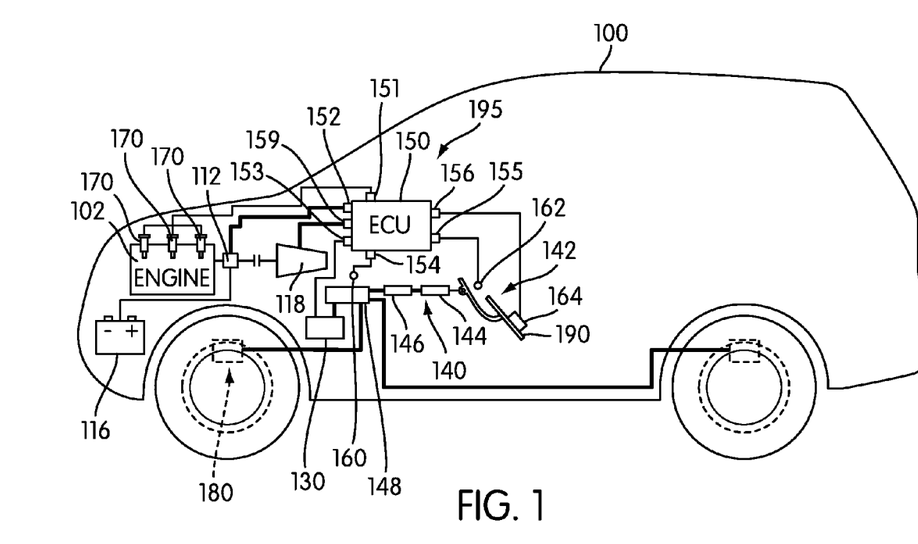
FIG. 1 is a schematic view of an embodiment of various components and systems for a motor vehicle.

FIG. 1 is a schematic view of an embodiment of motor vehicle 100. The term "motor vehicle" as used throughout this detailed description and in the claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drive train is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

For purposes of clarity, only some components of motor vehicle 100 are shown in the current embodiment. Furthermore, it will be understood that in other embodiments some of the components may be optional. Additionally, it will be understood that in other embodiments, any other arrangements of the components illustrated here can be used for powering motor vehicle 100.

Generally, motor vehicle 100 may be propelled by any power source. In some embodiments, motor vehicle 100 may be configured as a hybrid vehicle that uses two or more power sources. In other embodiments, motor vehicle 100 may use a single power source, such as an engine. In one embodiment, motor vehicle 100 includes engine 102 and electric motor 112. In particular, engine 102 may generate power using fuel such as gasoline or an ethanol/gasoline mixture. Likewise, electric motor 112 may generate power using electrical energy. In other embodiments, however, motor vehicle 100 may only include engine 102 for generating power. Also, in some embodiments, motor vehicle 100 may only include electric motor 112 for generating power.

In some cases, electric motor 112 may be connected to transmission 118. In some cases, transmission 118 could be an automatic transmission. In other cases, transmission 118 could be a manual transmission. This allows power from engine 102 to be transferred through electric motor 112 to transmission 118 in order to power motor vehicle 100. In some cases, electric motor 112 may provide an assist force that helps to propel motor vehicle 100.

Engine 102 and electric motor 112 may be configured to power motor vehicle 100 in any manner. In some embodiments, motor vehicle 100 may use a parallel type of hybrid design. In other embodiments, motor vehicle 100 may use a series type of hybrid design. In still other embodiments, any known hybrid design can be used for motor vehicle 100.

In some cases, motor vehicle 100 could include battery 116 that may be used to power electric motor 112. Battery 116 could be any type of rechargeable battery known in the art for powering electric vehicles and/or hybrid vehicles. In some cases, battery 116 could comprise a battery pack that comprises multiple batteries. Moreover, the location of battery 116 could vary in different embodiments.

In addition to drawing power from battery 116, electric motor 112 may also be used to recharge battery 116. In some cases, rotational energy may be delivered to electric motor 112 from the transmission. In some situations, this rotational energy may be converted into electrical energy. In other words, electric motor 112 may act as a generator to charge battery 116. In some cases, during braking, the kinetic energy of the vehicle may be converted into electrical energy using electric motor 112. Moreover, the process of converting energy provides a braking force that is separate from the braking force applied by a friction-based brake system. This process may be referred to as "regenerative braking".

Motor vehicle 100 can include braking system 140. Braking system 140 may include various components and subsystems that facilitate slowing down motor vehicle 100. For purposes of clarity, only some components of braking system 140 are shown in the current embodiment. In other embodiments, additional components may be included. Moreover, the components shown in the current embodiment may be optional.

Braking system 140 may include brake pedal 142. Braking system 140 may also include booster 144, which multiplies the braking force delivered by brake pedal 142. In some cases, braking system 140 may further include master cylinder 146. Master cylinder 146 receives a force from booster 144 and provides a corresponding pressure to one or more brakes 180. In some cases, braking system 140 can also include combination valve 148.

Generally, brakes 180 can be any type of brakes. Examples of different types of brakes include, but are not limited to: disc brakes, drum brakes as well as other kinds of brakes. In some cases, a combination of disc brakes and drum brakes could be used. For example, in some cases, disc brakes may be provided on the front wheels of a vehicle, while drum brakes may be provided on the rear wheels of a vehicle.

Some of the different components of braking system 140 may be connected by one or more brake lines, which carry brake fluid. For example, brakes 180 may receive hydraulic pressure from one or more brake lines. In some cases, separate brake lines may carry brake fluid to brakes associated with the front of the vehicle and to brakes associated with the rear of the vehicle. Moreover, any other arrangement of lines, tubes, valves and other components for transferring fluids between different components of braking system 140 can be used.

It will be understood that braking system 140 is shown schematically in the current embodiment. In other embodiments, other arrangements for braking system 140 can be used. The operation of braking system 140 generally starts as a driver depresses brake pedal 142. The mechanical force applied to brake pedal 142 may be multiplied at booster 144 and delivered to master cylinder 146. At master cylinder 146, the transmitted mechanical force may be converted to a hydraulic force that is delivered to one or more brakes via brake fluid.

In some embodiments, braking system 140 may be provided with hydraulic assist system 130. Hydraulic assist system 130 could be any system capable of providing additional hydraulic force to one or more brakes. In some cases, hydraulic assist system 130 could be an automated device that increases the hydraulic pressure within one or more components of braking system 140. In some cases, hydraulic assist system 130 may be connected to combination valve 148. In other cases, hydraulic assist system 130 may be connected to master cylinder 146. In still other cases, hydraulic assist system 130 could be connected to any other portion of braking system 140. In situations where additional braking force is desired, ECU 150 may be configured to activate hydraulic assist system 130. Hydraulic assist system 130 may then act to increase the braking pressure within one or more portions of braking system 140. This may increase the overall braking pressure applied by brakes 180.

Generally, hydraulic assist system 130 could increase the braking pressure by any amount. In some cases, hydraulic assist system 130 could increase the braking pressure by a fixed amount. In other cases, hydraulic assist system 130 could increase the braking pressure by a variable amount. Moreover, hydraulic assist system 130 could act to increase the brake line pressure in various different ways. In some cases, hydraulic assist system 130 could provide additional hydraulic pressure to braking system 140 by providing a new source of brake fluid. In other embodiments, hydraulic assist system 130 could provide additional hydraulic pressure to braking system 140 by modifying the force applied by booster 144 to master cylinder 146.

Motor vehicle 100 may include provisions for communicating, and in some cases controlling, the various components associated with motor vehicle 100. In some embodiments, motor vehicle 100 may be associated with a computer or similar device. In the current embodiment, motor vehicle 100 may include electronic control unit 150, hereby referred to as ECU 150. In one embodiment, ECU 150 may be configured to communicate with, and/or control, various components of motor vehicle 100.

In some cases, ECU 150 may include a microprocessor, RAM, ROM, and software all serving to monitor and supervise various parameters of motor vehicle 100. For example, ECU 150 is capable of receiving signals from numerous sensors located in the engine. The output of various sensors is sent to ECU 150 where the sensor signals may be stored in an electronic storage, such as RAM. Both current and electronically stored sensor signals may be processed by a central processing unit (CPU) in accordance with software stored in an electronic memory, such as ROM.

ECU 150 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 150 are optional. Some embodiments may include a given port or provision, while others may exclude it. The following description discloses many of the possible ports and provisions that can be used, however, it should be kept in mind that not every port or provision must be used or included in a given embodiment.

In some embodiments, ECU 150 may be configured to communicate with and/or control engine 102. For example, in some cases, ECU 150 may be configured to control fuel injectors, spark plugs, valves, a throttle valve, as well as other components associated with engine 102.

In some embodiments, ECU 150 may include port 151 for communicating with and/or controlling fuel injectors 170. Fuel injectors 170 could be any type of fuel injectors that are configured to inject fuel into one or more cylinders of an engine. Moreover, fuel injectors 170 could be further associated with other components of a fuel injection system including fuel rails, fuel pumps, fuel pressure regulators as well as various sensors, which are not shown here for purposes of clarity. For purposes of illustration, three fuel injectors are illustrated in the current embodiment, however in other embodiments any number of fuel injectors may be used with engine 102.

Although a single port is shown for communicating with fuel injectors 170, in other embodiments, multiple ports could be used so that each fuel injector communicates with ECU 150 using a separate port. Moreover, in other embodiments additional ports could be provided for communicating with other components or systems associated with engine 102 including, but not limited to: spark plugs, electronically controlled valves, an electronically controlled throttle as well as other systems utilized for the operation of engine 102.

In some embodiments, ECU 150 may include port 152 for communicating with electric motor 112. In some cases, ECU 150 may control the operation of electric motor 112. For example, ECU 150 may control electric motor 112 to generate power for propelling motor vehicle 100. ECU 150 may also control electric motor 112 in a regenerative braking mode when motor vehicle 100 is braking, in order to recharge battery 116 and increase the energy efficiency of motor vehicle 100.

In some embodiments, ECU 150 may include port 159 for communicating with transmission 118. In some cases, ECU 150 may send control signals to transmission 118 to automatically initiate gear shift changes.

In some embodiments, ECU 150 may include port 153 for communicating with hydraulic assist system 130. In some cases, ECU 150 may send control signals to activate or deactivate hydraulic assist system 130. In addition, ECU 150 may control hydraulic assist system 130 to increase the hydraulic pressure of braking system 140 by a predetermined amount.

In some embodiments, ECU 150 can include provisions for receiving information related to various operating parameters of motor vehicle 100. In some embodiments, ECU 150 may include port 154 for receiving information related to the hydraulic pressure within braking system 140. In some cases, ECU 150 may receive information from pressure sensor 160 that is disposed in a portion of braking system 140. Generally, pressure sensor 160 may be located in any part of braking system 140. In some cases, pressure sensor 160 may be associated with master cylinder 146. In other cases, pressure sensor 160 may be associated with combination valve 148. In still other cases, pressure sensor 160 could be disposed in any other portion of braking system 140, including any portion of a brake line. Moreover, in other embodiments, multiple pressure sensors could be provided at different locations within braking system 140. Using this arrangement, ECU 150 may receive information related to the hydraulic pressure inside one or more components of braking system 140. In some cases, this information can be used to determine the braking force being applied to brakes 180.

In some embodiments, ECU 150 may include port 155 for receiving information related to the position of brake pedal 142. In some cases, ECU 150 may receive information from position sensor 162. In some embodiments, position sensor 162 may be configured to detect the travel distance of brake pedal 142. In other words, position sensor 162 could determine how far brake pedal 142 is from a default position. An example of a sensor for measuring brake pedal travel is disclosed in Takeshima, U.S. Pat. No. 5,779,329, filed May 24, 1996, the entirety of which is hereby incorporated by reference. In other embodiments, any other sensors known in the art for detecting pedal traveling distance could be used. In other embodiments, position sensor 162 could be configured to detect an angle of the brake pedal, as measured from some default angle. In such embodiments, any sensor capable of measuring the angle of a depressed brake pedal relative to a default position may be used. In still other embodiments, a motor vehicle could be equipped with both a pedal travel sensor and an angle sensor. Moreover, it will be understood that any other systems or devices known in the art for detecting the position of a brake pedal relative to a default position could be used.

In some embodiments, ECU 150 may include port 156 for receiving information related to forces or pressures applied to the surface of a brake pedal. In one embodiment, ECU 150 may receive information from surface pressure sensor 164. In some cases, surface pressure sensor 164 may be disposed on surface 190 of brake pedal 142. Surface pressure sensor 164 may be capable of measuring the pressure and/or force applied to surface 190 as brake pedal 142 is depressed by a driver's foot.

Generally, surface pressure sensor 164 could be any type of sensor. In some embodiments, surface pressure sensor 164 could be a piezoelectric device. In other embodiments, surface pressure sensor 164 could be a strain gauge device. In still other embodiments, surface pressure sensor 164 could be any other type of sensor capable of measuring the pressure applied by a driver's foot.

In some embodiments, surface pressure sensor 164 could be disposed on top of surface 190. In other embodiments, surface pressure sensor 164 could be embedded within surface 190 of brake pedal 142. In other words, in some cases, surface pressure sensor 164 may not be raised above surface 190.

For purposes of clarity, only some sensors associated with motor vehicle 100 are shown in the current embodiment. However, it will be understood that in other embodiments, any other types of sensors can be used to detect operating information related to one or more systems of a motor vehicle. In embodiments including additional sensors, ECU 150 may be configured with additional ports for communicating with the various different sensors. Moreover, in other embodiments, ECU 150 could include additional ports for communicating with various different vehicle systems.

In some embodiments, motor vehicle 100 can include a braking control system 195. Braking control system 195 may comprise some of the components discussed above and illustrated in FIG. 1. In particular, braking control system 195 may comprise one or more components or systems that may be used to monitor and provide some control over braking system 140. For example, in some embodiments, braking control system 195 may comprise ECU 150 as well as the various different components associated with ECU 150. In some embodiments, braking control system 195 could include some provisions but not others. Using this arrangement, braking control system 195 may be capable of monitoring braking system 140 as well as controlling any other systems that are required to facilitate braking of motor vehicle 100.

In some embodiments, braking control system 195 may be capable of applying various braking countermeasures that act to brake or otherwise slow down a vehicle. Some of these countermeasures may utilize components of braking system 140, while others may not. The term "braking countermeasure" as used throughout this detailed description and in the claims refers to any method of braking a vehicle that is controlled by an automated system associated with a motor vehicle.

Figure 2:
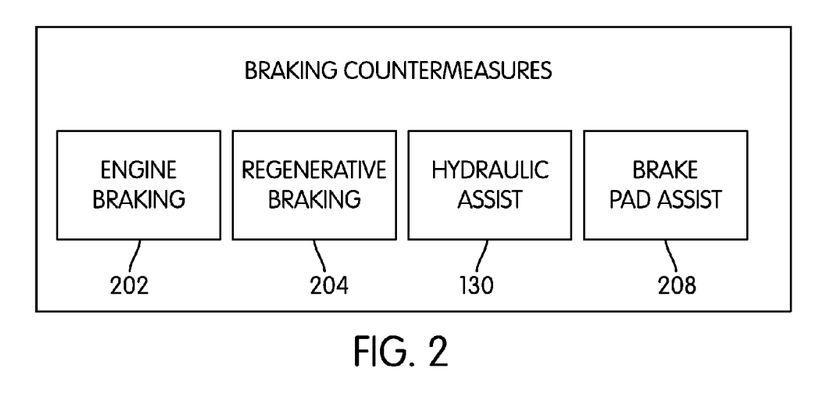
FIG. 2 is a schematic view of different braking countermeasures related to different embodiments of the motor vehicle of FIG. 1.

FIG. 2 illustrates a schematic view of an embodiment of some braking countermeasures that may be used to slow down a vehicle. In some embodiments, a motor vehicle may use engine braking 202. Generally, engine braking 202 can be controlled in different ways. In some cases, engine braking 202 may be activated by automatically downshifting transmission 118 to a lower gear. In other cases, engine braking 202 could be controlled by entering a fuel cut mode, in which fuel is not delivered to one or more cylinders of engine 102. In still other cases, the throttle of a vehicle may be automatically controlled to facilitate engine braking 202. In still other cases, any known methods for automatically controlling engine braking 202 in a motor vehicle could be used.

In some cases, motor vehicle 100 may use regenerative braking 204 to help slow down a vehicle. Regenerative braking may occur when electric motor 112 converts the kinetic energy of motor vehicle 100 into electrical energy for storage in battery 116. In some cases, braking control system 195 may activate regenerative braking 204 in order to provide additional braking for motor vehicle 100.

In addition to utilizing various operating modes of a motor vehicle to provide additional braking, braking control system 195 may also use hydraulic assist system 130. In some cases, braking control system 195 may activate hydraulic assist system 130 for purposes of increasing the braking force generated by braking system 140. In some cases, braking control system 195 may determine that the braking force currently supplied by braking system 140 is not sufficient. Therefore, braking control system 195 may activate hydraulic assist system 130 to generate additional braking force.

In some embodiments, another braking countermeasure that could be utilized by braking control system 195 is brake pad assist 208. The term "brake pad assist" as used throughout this detailed description and in the claims refers to any method of increasing brake pad pressure. In some cases, brake pad assistance could take the form of an electrical device that is connected to the brake pad which can supply an additional force on demand.

Figure 3:
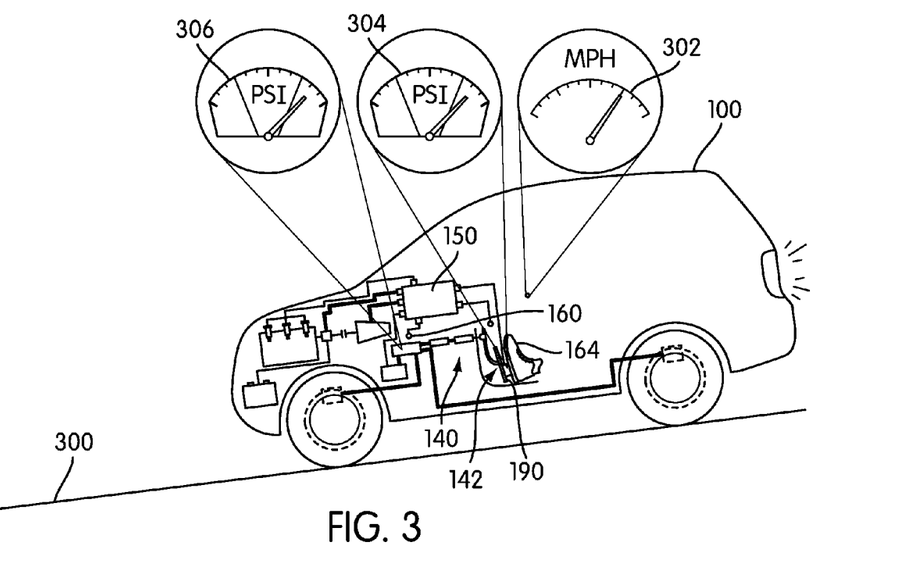
FIG. 3 is a schematic view of the motor vehicle of FIG. 1 braking down a hill.
Figure 4:
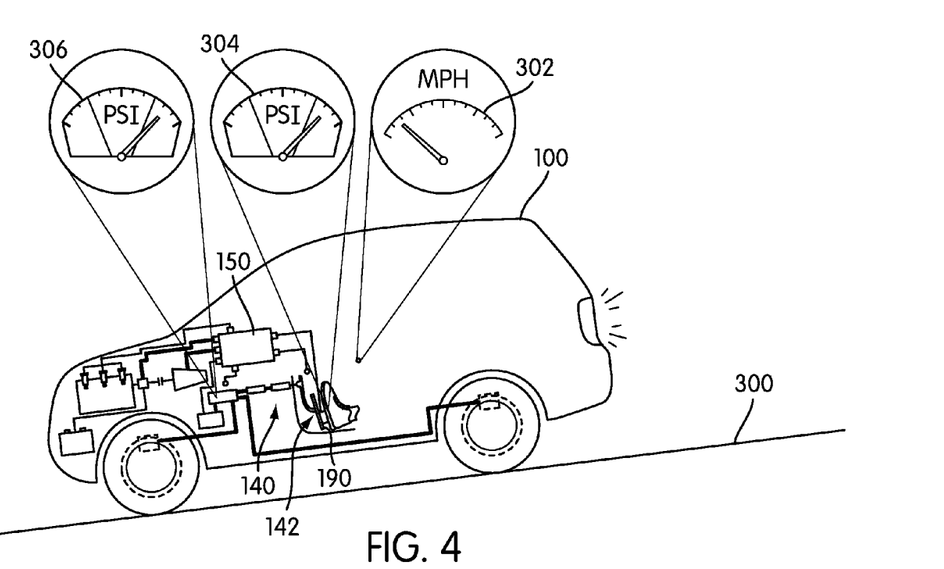
FIG. 4 is a schematic view of the motor vehicle of FIG. 1 braking down a hill.

FIGS. 3 and 4 illustrate schematic views of the normal operation of motor vehicle 100. Referring to FIGS. 3 and 4, motor vehicle 100 travels on roadway 300 at high speed, as indicated by speedometer 302. As seen in FIG. 3, as a driver depresses brake pedal 142, braking system 140 functions properly. In particular, the applied pressure detected at surface 190 and the hydraulic pressure detected within one or more components of braking system 140 are both high. For purposes of illustration, the pressure detected at surface 190 is indicated as pressure gauge 304 and the hydraulic pressure detected within braking system 140 is indicated as pressure gauge 306. The pressure at surface 190 may be detected by surface pressure sensor 164. The hydraulic pressure within one or more components of braking system 140 may be detected using pressure sensor 160. Both pressure gauge 304 and pressure gauge 306 show relatively high pressures. In other words, the initial force applied by the driver is being properly transmitted through braking system 140. Referring to FIG. 4, vehicle 100 eventually slows down due to the braking force, as indicated by speedometer 302 which shows a much lower speed.

For purposes of illustration, the pressures shown for the brake pedal surface and the internal hydraulic pressure of the braking system may be shown as similar values. However, it will be understood that the pressure detected at a brake pedal surface and the hydraulic pressure inside a component of the braking system may not be identical even during normal operation. In particular, the force applied at the pedal may be multiplied by a pressure booster, as well as other components inside the braking system. However, during normal braking operation, there is an expected relationship between the pressure detected at the brake pedal surface and the hydraulic pressure within the braking system. Therefore, to determine if the braking system is operating properly, the braking control system may compare the measured pressures at the brake pedal and inside the braking system with the expected relationship to determine if there are any problems. Details of comparing measured pressures to known relationships between pedal surface pressure and hydraulic pressure are discussed in detail below.

A braking control system can include provisions for detecting potential braking problems or malfunctions. In some cases, the braking control system can include provisions for detecting situations where the braking force applied by a driver at the brake pedal is not being properly transmitted to other components of a braking system. In some cases, the braking control system can also activate one or more braking countermeasures that help slow a vehicle.

Figure 5:
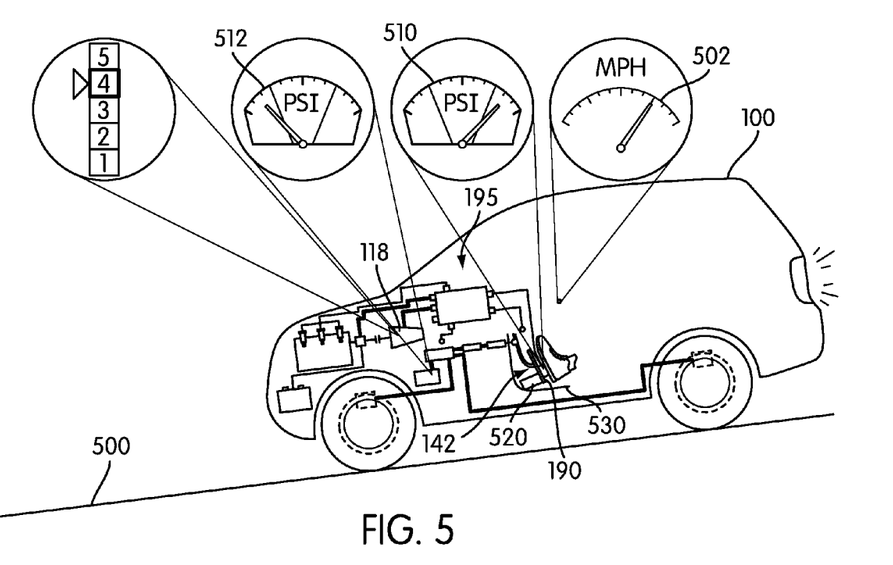
FIG. 5 is a schematic view of the motor vehicle of FIG. 1 braking down a hill with an object obstructing the motion of a brake pedal.
Figure 6:
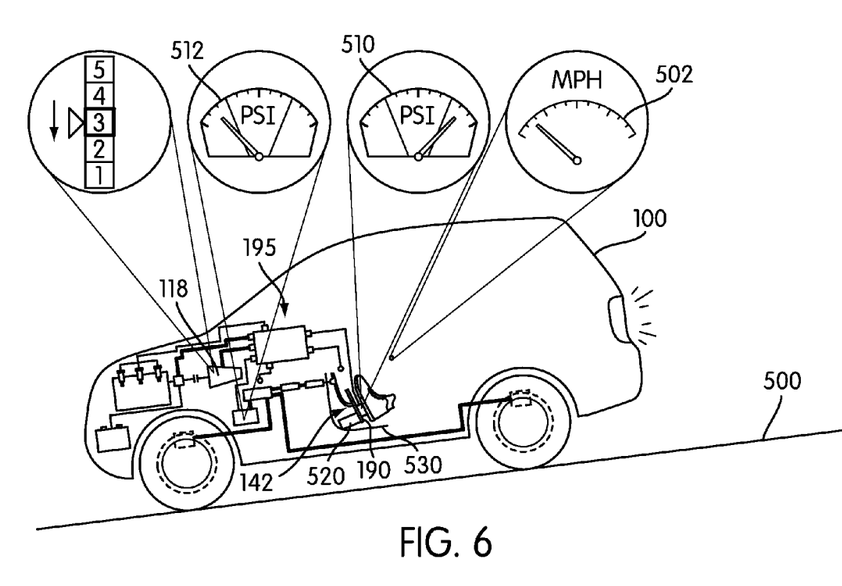
FIG. 6 is a schematic view of the motor vehicle of FIG. 1 braking down a hill with an object obstructing the motion of a brake pedal, in which engine braking has been activated to help slow down the motor vehicle.

FIGS. 5 and 6 illustrate schematic views of an embodiment of a method of detecting a braking abnormality and applying engine braking as a countermeasure. Referring to FIG. 5, motor vehicle 100 is driving down hill 500 at a relatively high speed as indicated by speedometer 502. The driver depresses brake pedal 142 in order to slow vehicle 100 down. However, object 520 has become wedged between brake pedal 142 and floor surface 530. Due to the presence of object 520, brake pedal 142 cannot be fully depressed even though the driver intends to fully depress brake pedal 142.

In this situation, braking control system 195 may monitor the pressures detected at brake pedal surface 190 and within braking system 140. The pressure detected at brake pedal surface 190 is relatively high, as indicated by pressure gauge 510. In contrast, the hydraulic pressure inside one or more components of brake system 140 is relatively low, as indicated by pressure gauge 512. At this point, braking control system 195 may determine that there is a problem since the pedal surface pressure and the hydraulic pressure are sufficiently different. In order to increase the braking force of motor vehicle 100, braking control system 195 may activate a braking countermeasure. In the current embodiment, braking control system 195 may activate engine braking to help slow down the vehicle.

In order to active engine braking, braking control system 195 may automatically control transmission 118 to downshift. Initially, as seen in FIG. 5, transmission 118 is in a fourth gear position. Therefore, to engage engine braking, braking control system 195 downshifts transmission 118 to a third gear position as seen in FIG. 6. With transmission 118 downshifted, engine braking may begin to slow motor vehicle 100 as indicated by speedometer 502.

Using this method of controlling a braking system, braking control system 195 may provide additional braking forces to slow down motor vehicle 100. In particular, braking system 140 may apply some braking force, while additional braking force may be supplied by the engine braking effect that occurs when transmission 118 is automatically downshifted.

In some embodiments, upon detecting a braking problem, braking control system 195 may calculate the necessary additional braking force required by engine braking so that the total braking force created by braking system 140 and engine braking is equivalent to the intended braking force desired by the driver. In particular, the intended braking force may be determined by considering the force or pressure applied to surface pressure sensor 164. Additionally, the actual force being applied by braking system 140 can be determined from the pressure detected by pressure sensor 160. The difference between the intended braking force and the actual braking force supplied by braking system 140 can then be determined and used to calculate the necessary additional braking force to slow down motor vehicle 100 at the intended rate. In other cases, engine braking can be applied in a manner that generates a predetermined braking force whenever braking problems are detected.

Figure 7:
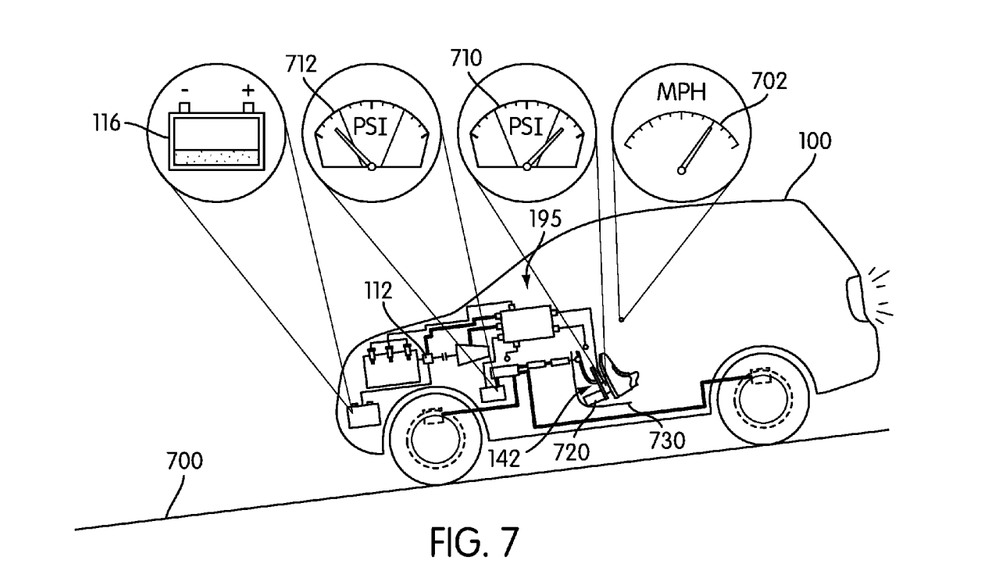
FIG. 7 is a schematic view of the motor vehicle of FIG. 1 braking down a hill with an object obstructing the motion of a brake pedal.
Figure 8:
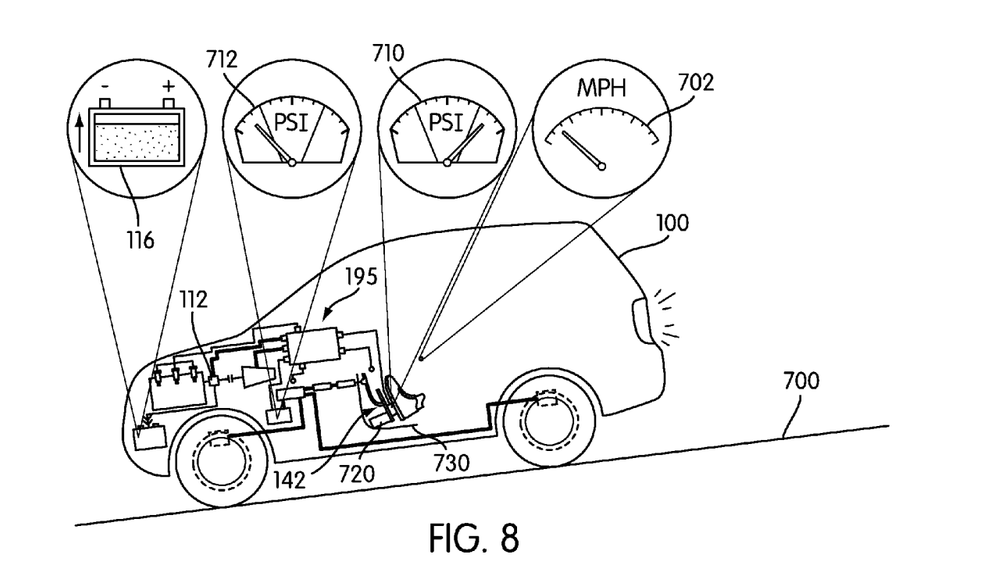
FIG. 8 a schematic view of the motor vehicle of FIG. 1 braking down a hill with an object obstructing the motion of the brake pedal, in which regenerative braking has been activated to help slow down the motor vehicle.

FIGS. 7 and 8 illustrate schematic views of an embodiment of a method of detecting a braking abnormality and applying regenerative braking as a countermeasure. Referring to FIG. 7, motor vehicle 100 is driving down hill 700 at a relatively high speed as indicated by speedometer 702. The driver depresses brake pedal 142 in order to slow vehicle 100 down. However, object 720 has become wedged between brake pedal 142 and floor surface 730. Due to the presence of object 720, brake pedal 142 cannot be fully depressed even though the driver intends to fully depress brake pedal 142.

In this situation, braking control system 195 may monitor the pressures detected at brake pedal surface 190 and within braking system 140. The pressure detected at brake pedal surface 190 is relatively high, as indicated by pressure gauge 710. In contrast, the hydraulic pressure inside one or more components of brake system 140 is relatively low, as indicated by pressure gauge 712. At this point, braking control system 195 may determine that there is a problem since the pedal surface pressure and the hydraulic pressure are sufficiently different. In order to increase the braking force of motor vehicle 100, braking control system 195 may activate a braking countermeasure. In the current embodiment, braking control system 195 may activate regenerative braking to help slow down the vehicle.

In order to active regenerative braking, braking control system 195 may automatically control electric motor 112 to begin charging battery 116. Initially, as seen in FIG. 7, battery 116 has a relatively low charge. In contrast, as seen in FIG. 8, battery 116 is in the process of being recharged by electric motor 112. Moreover, as electric motor 112 works to recharge battery 116, the transfer of energy from electric motor 112 to battery 116 provides a braking effect on motor vehicle 100. In particular, the kinetic energy of motor vehicle 100 is converted into electrical energy that is stored in battery 116.

Using this method of controlling a braking system, braking control system 195 may provide additional braking forces to slow down motor vehicle 100. In particular, braking system 140 may apply some braking force, while additional braking force may be supplied by the regenerative braking effect that occurs when electric motor 112 acts as a generator to charge battery 116.

In some embodiments, upon detecting a braking problem, braking control system 195 may calculate the necessary additional braking force required by regenerative braking so that the total braking force created by braking system 140 and regenerative braking is equivalent to the intended braking force desired by the driver. In particular, the intended braking force may be determined by considering the force or pressure applied to surface pressure sensor 164. Additionally, the actual force being applied by braking system 140 can be determined from the pressure detected by pressure sensor 160. The difference between the intended braking force and the actual braking force supplied by braking system 140 can then be determined and used to calculate the necessary additional braking force to slow down motor vehicle 100 at the intended rate. In other cases, regenerative braking can be applied in a manner that generates a predetermined braking force whenever braking problems are detected.

Figure 9:
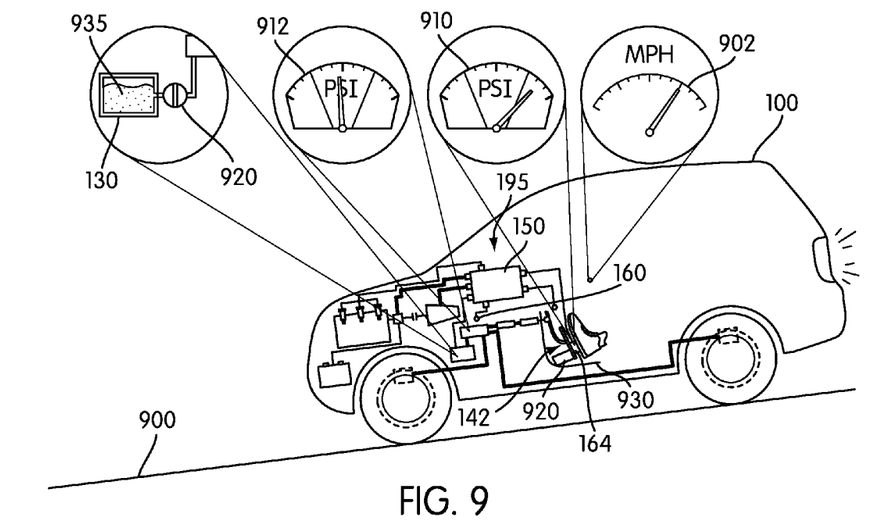
FIG. 9 a schematic view of the motor vehicle of FIG. 1 braking down a hill with an object obstructing the motion of a brake pedal.
Figure 10:
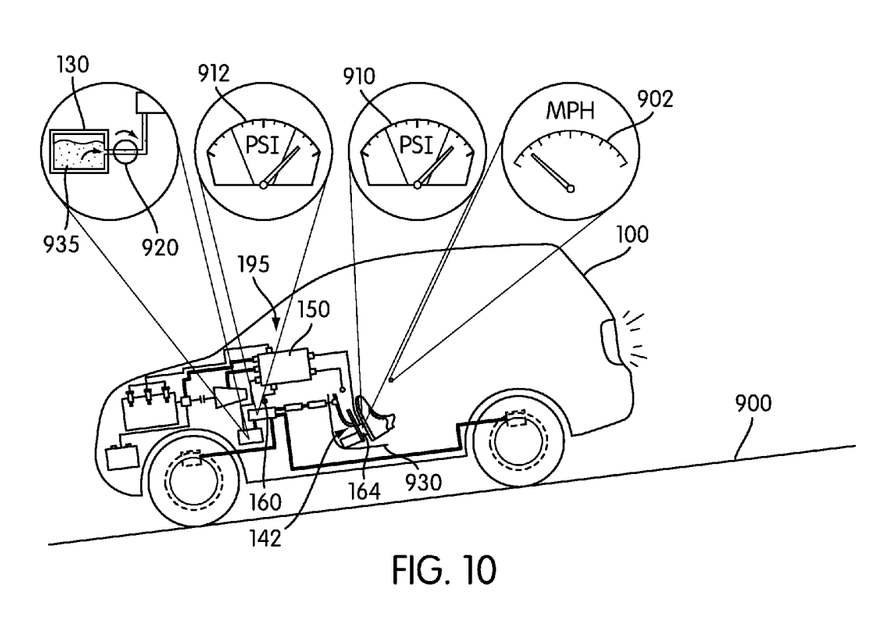
FIG. 10 is a schematic view of the motor vehicle of FIG. 1 braking down a hill with an object obstructing the motion of the brake pedal, in which hydraulic assist has been activated to increase the hydraulic pressure within the braking system.

FIGS. 9 and 10 illustrate schematic views of an embodiment of a method of detecting a braking abnormality and applying hydraulic assist as a countermeasure. Referring to FIG. 9, motor vehicle 100 is driving down hill 900 at a relatively high speed as indicated by speedometer 902. The driver depresses brake pedal 142 in order to slow vehicle 100 down. However, object 920 has become wedged between brake pedal 142 and floor surface 930. Due to the presence of object 920, brake pedal 142 cannot be fully depressed even though the driver intends to fully depress brake pedal 142.

In this situation, braking control system 195 may monitor the pressure detected at brake pedal surface 190 and within braking system 140. The pressure detected at brake pedal surface 190 is relatively high, as indicated by pressure gauge 910. In contrast, the hydraulic pressure inside one or more components of brake system 140 is relatively low, as indicated by pressure gauge 912. At this point, braking control system 195 may determine that there is a problem since the pedal surface pressure and the hydraulic pressure are sufficiently different. In order to increase the braking force of motor vehicle 100, braking control system 195 may activate a braking countermeasure. In the current embodiment, braking control system 195 may activate hydraulic assist to help slow down the vehicle.

In order to active hydraulic assist, braking control system 195 may automatically control hydraulic assist system 130. Hydraulic assist system 130 may comprise brake fluid 935 that may be used to supply additional hydraulic force to braking system 140. Initially, as seen in FIG. 9, hydraulic assist system 130 is not in fluid communication with braking system 140. In particular, valve 920 is closed. In contrast, as seen in FIG. 10, valve 920 is opened so that brake fluid 935 may flow into braking system 140. In some embodiments, hydraulic assist system 130 supplies an additional hydraulic force to braking system 140 that increases the overall hydraulic pressure within braking system 140. As seen in FIG. 10, the hydraulic pressure detected at pressure sensor 160 is increased following the activation of hydraulic assist system 130. This provides a means of matching the actual braking force supplied by braking system 140 to the intended braking force determined by the pressure detected at surface pressure sensor 164.

Using this method of controlling a braking system, braking control system 195 may automatically increase the braking force supplied by braking system 140 in order to help slow down motor vehicle 100. In contrast to the engine braking and regenerative braking countermeasures, the method of using hydraulic assist uses braking system 140 to supply all of the braking force to slow down motor vehicle 100.

In some embodiments, upon detecting a braking problem, braking control system 195 may calculate the necessary additional braking force required by hydraulic assist so that the braking force created by braking system 140 is equivalent to the intended braking force desired by the driver. In particular, the intended braking force may be determined by considering the force or pressure applied to surface pressure sensor 164. Additionally, the actual force being applied by braking system 140 can be determined from the pressure detected by pressure sensor 160. The difference between the intended braking force and the actual braking force supplied by braking system 140 can then be determined and used to calculate the necessary additional braking force to slow down motor vehicle 100 at the intended rate. In other cases, hydraulic assist can be applied in a manner that generates a predetermined braking force whenever braking problems are detected.

It will be understood that the operation of hydraulic assist system 130 is shown schematically in FIGS. 9 and 10. In other embodiments, hydraulic assist system could operate in any manner to supply additional hydraulic forces to braking system 140. In some cases, hydraulic assist system 130 could comprise a motor or other electrical device that helps to automatically generate additional hydraulic pressure. Moreover, in some cases, hydraulic assist system 130 may not be a separate component or system, but may comprise one or more components integrated into braking system 140 that can be used to automatically increase the hydraulic force within one or more brake lines.

Figure 11:
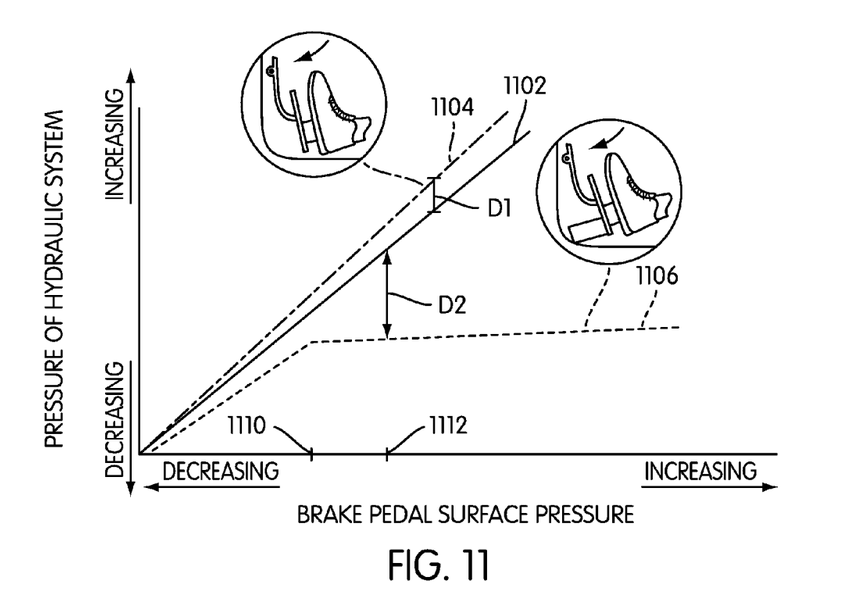
FIG. 11 is a view of various relationships between hydraulic pressure and brake pedal surface pressure related to the embodiments.

FIG. 11 illustrates various relationships between brake pedal surface pressure and hydraulic pressure related to embodiments of a braking control system. For purposes of clarity, the value of hydraulic pressure is shown on the vertical axis, while the brake pedal surface pressure is shown on the horizontal axis. In this way, the hydraulic pressure may be understood as a function of the brake pedal surface pressure. However, it will be understood that in other embodiments, the brake pedal surface pressure could be shown on the vertical axis and the hydraulic pressure could be shown on the horizontal axis. In other words, it is possible to consider in an equivalent manner the brake pedal surface pressure as a function of the hydraulic pressure.

For purposes of determining if the pedal surface pressure and the hydraulic pressure detected by various sensors are properly correlated, a braking control system may use predetermined braking relationship 1102. Predetermined braking relationship 1102 represents the expected relationship between the hydraulic pressure of the braking system and the pedal surface pressure applied by the driver. In other words, predetermined braking relationship 1102 represents an expected correlation between the hydraulic pressure and the pedal surface pressure.

Generally, this predetermined relationship could take any form. In some cases, predetermined braking relationship 1102 could be a linear relationship. In other cases, predetermined braking relationship 1102 could be a non-linear relationship. Also, in some embodiments, predetermined braking relationship 1102 could be stored in memory within ECU 150 (see FIG. 1). In other embodiments, predetermined braking relationship 1102 may be stored in another component of motor vehicle 100. Moreover, predetermined braking relationship 1102 could be determined at the time of manufacturing, or at a later time. In some cases, one or more components of a braking system could be provided with information indicating an expected relationship between hydraulic pressure and surface pressure at the brake pedal.

FIG. 11 also shows examples of measured braking relationships including first measured braking relationship 1104 and second measured braking relationship 1106. As previously discussed, the hydraulic pressure detected inside a braking system and the pressure detected at the brake pedal surface may be monitored during the operation of a vehicle. In some cases, both the hydraulic pressure and the pedal pressure are received as a function of time. By matching up corresponding times, a braking control system can determine the actual relationship between the hydraulic pressure and the pedal pressure.

First measured braking relationship 1104 is illustrated as a substantially linear relationship that is similar to predetermined braking relationship 1102. First measured braking relationship 1104 is an example of a braking relationship that may be measured when a braking system is operating normally. Moreover, the values of hydraulic pressure as a function of surface pedal pressure are substantially similar for first measured braking relationship 1104 and predetermined braking relationship 1102.

In this example, second measured braking relationship 1106 is substantially different than predetermined braking relationship 1102. Second measured braking relationship 1106 is an example of a braking relationship that may be measured when some problem is occurring, such as when an object blocks the traveling path of the brake pedal. For small values of pedal pressure, second measured braking relationship 1106 may be similar to predetermined braking relationship 1102. However, at pedal pressure value 1110 of the pedal pressure, second measured braking relationship 1106 begins to deviate substantially from predetermined braking relationship 1102. In particular, the hydraulic pressure of second measured braking relationship 1106 stays substantially constant while the pedal pressure increases. Moreover, the difference between predetermined braking relationship 1102 and second measured braking relationship 1106 grows as the pedal pressure increases. This type of braking relationship may occur as a driver presses down with increased pressure on the brake pedal, but the brake pedal is stuck and therefore does not deliver the intended force to the braking system.

In some cases, a braking control system may use a threshold difference to determine if a measured braking relationship is substantially different from a predetermined braking relationship. For example, first measured braking relationship 1104 is within threshold difference D1 of predetermined braking relationship 1102. In other words, the difference between the hydraulic pressure of first measured braking relationship 1104 and predetermined braking relationship 1102 as a function of pedal surface pressure is never greater than threshold distance difference D1. In contrast, the difference between the hydraulic pressure of second measured braking relationship 1106 and predetermined braking relationship 1102 as a function of pedal surface pressure is greater than threshold difference D1 for pedal surface pressure values larger than pedal pressure value 1110. For example, at pedal surface pressure value 1112 the difference between the hydraulic pressure of second measured braking relationship 1106 and predetermined braking relationship 1102 is difference D2, which is much greater than threshold difference Dl. Upon detecting this difference between second measured braking relationship 1106 and predetermined braking relationship 1102, the braking control system could activate one or more braking countermeasures to help provide the intended braking force for the motor vehicle.

Although the current embodiment discusses a threshold for comparing the hydraulic pressure of different braking relationships, in other embodiments a threshold for pedal surface pressure could also be used. In other words, to determine if a measured braking relationship is similar or different from a predetermined braking relationship, a braking control system could determine if the pedal surface pressure of the measured braking relationship is within a threshold value of the pedal surface pressure of the predetermined braking relationship.

In some embodiments, the values of a measured braking relationship and a predetermined braking relationship could be compared at a single value of pedal surface pressure or hydraulic pressure. In other cases, however, a braking control system could compare the average difference between the pedal surface pressure or the hydraulic pressure over a range of values.

Figure 12:
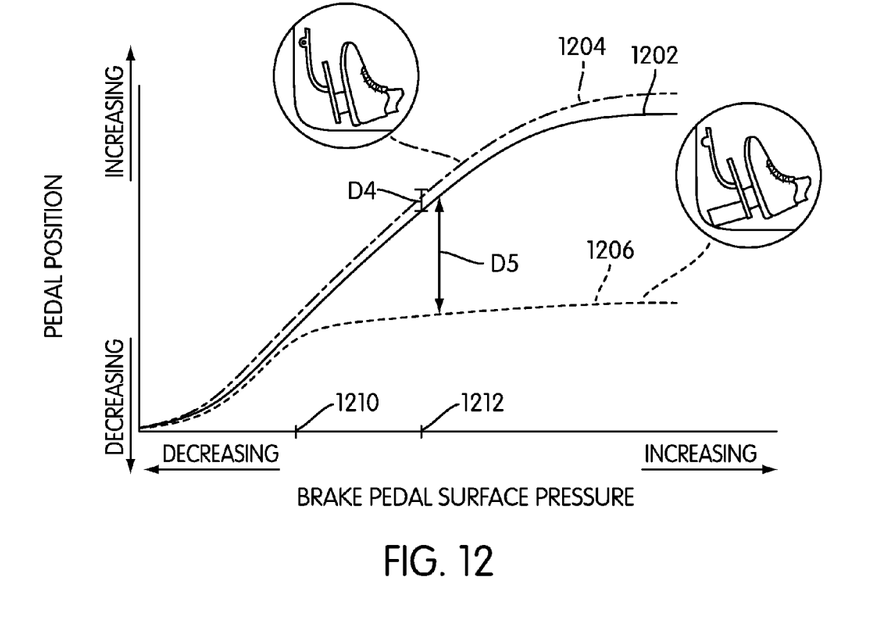
FIG. 12 is a view of various relationships between brake pedal position and brake pedal surface pressure related to the embodiments.

FIG. 12 illustrates various relationships between brake pedal surface pressure and brake pedal position related to embodiments of a braking control system. For purposes of clarity, the value of pedal position is shown on the vertical axis, while the pedal surface pressure is shown on the horizontal axis. In this way, the pedal position may be understood as a function of the pedal surface pressure. However, it will be understood that in other embodiments, the pedal surface pressure could be shown on the vertical axis and the pedal position could be shown on the horizontal axis. In other words, it is possible to consider in an equivalent manner the pedal surface pressure as a function of the pedal surface pressure.

As previously discussed, the position of a brake pedal can be determined in different ways. In some cases, the position can be determined using pedal angle information. The pedal angle information could be received from a pedal angle sensor. In other cases, the position can be determined using pedal travel distance information related to the distance a pedal has moved from a default position. The pedal travel distance information can be received using a pedal travel sensor.

For purposes of determining if the pedal surface pressure and the pedal position detected by various sensors are properly correlated, a braking control system may use predetermined braking relationship 1202. Predetermined braking relationship 1202 represents the expected relationship between the position of the brake pedal and the pedal surface pressure applied by the driver. In other words, predetermined braking relationship 1202 represents an expected correlation between the pedal position and the surface pedal pressure.

Generally, this predetermined relationship could take any form. In some cases, predetermined braking relationship 1202 could be a linear relationship. In other cases, predetermined braking relationship 1202 could be a non-linear relationship. Also, in some embodiments, predetermined braking relationship 1202 could be stored in memory within ECU 150 (see FIG. 1). In other embodiments, predetermined braking relationship 1202 may be stored in another component of motor vehicle 100. Moreover, predetermined braking relationship 1202 could be determined at the time of manufacturing, or at a later time. In some cases, one or more components of a braking system could be provided with information indicating an expected relationship between pedal position and surface pressure at the brake pedal.

FIG. 12 also shows examples of measured braking relationships including first measured braking relationship 1204 and second measured braking relationship 1206. As previously discussed, the position of the brake pedal and the pressure detected at the brake pedal surface may be monitored during the operation of a vehicle. In some cases, both the pedal position and the pedal pressure are received as a function of time. By matching up corresponding times, a braking control system can determine the actual relationship between the pedal position and the pedal pressure.

First measured braking relationship 1204 is illustrated as a substantially non-linear relationship that is similar to predetermined braking relationship 1202. Moreover, the values of hydraulic pressure as a function of pedal surface pressure are substantially similar for first measured braking relationship 1204 and predetermined braking relationship 1202. In contrast, second measured braking relationship 1206 is substantially different than predetermined braking relationship 1202. For small values of pedal surface pressure, second measured braking relationship 1206 may be similar to predetermined braking relationship 1202. However, at value 1210 of the pedal surface pressure, second measured braking relationship 1206 begins to deviate substantially from predetermined braking relationship 1202. In particular, the pedal position of second measured braking relationship 1206 stays substantially constant while the pedal surface pressure increases. Moreover, the difference between predetermined braking relationship 1202 and second measured braking relationship 1206 grows as the pedal surface pressure increases.

In some cases, a braking control system may use a threshold difference to determine if a measured braking relationship is substantially different from a predetermined braking relationship. For example, first measured braking relationship 1204 is within threshold difference D4 of predetermined braking relationship 1202. In other words, the difference between the pedal position of first measured braking relationship 1204 and predetermined braking relationship 1202 as a function of pedal surface pressure is never greater than threshold difference D4. In contrast, the difference between the pedal position of second measured braking relationship 1206 and predetermined braking relationship 1202 as a function of pedal surface pressure is greater than threshold distance difference D4 for pedal surface pressure values substantially larger than pedal pressure value 1210. For example, at pedal pressure value 1212 the difference between the hydraulic pressure of second measured braking relationship 1206 and predetermined braking relationship 1202 is difference D5, which is much greater than threshold difference D4. Upon detecting this difference between second measured braking relationship 1206 and predetermined braking relationship 1202, the braking control system could activate one or more braking countermeasures to help provide the intended braking force for the motor vehicle.

Although the current embodiment discusses a threshold for comparing the pedal position of different braking relationships, in other embodiments a threshold for pedal surface pressure could also be used. In other words, to determine if a measured braking relationship is similar or different from a predetermined braking relationship, a braking control system could determine if the pedal surface pressure of the measured braking relationship is within a threshold difference of the pedal surface pressure of the predetermined braking relationship.

In some embodiments, the values of a measured braking relationship and a predetermined braking relationship could be compared at a single value of pedal surface pressure or pedal position. In other cases, however, a braking control system could compare the average difference between the pedal surface pressure or the pedal position over a range of values.

FIGS. 5 through 12 illustrate embodiments of detecting braking abnormalities that may occur when an object obstructs the full range of motion of a brake pedal. This is one possible braking abnormality scenario. Some embodiments can also detect and address other braking abnormality scenarios. The obstructing object scenario is merely one of many possible braking abnormalities contemplated by the various embodiments. It will be understood, however, that the embodiments discussed here for detecting braking abnormalities and applying braking countermeasures could be applied in various other situations where braking abnormalities or malfunctions occur. In other words, the application of the control system discussed above is not limited to situations where braking problems occur due to obstructing objects. For example, air in one or more brake lines can cause problems since air is more compressible than brake fluid. If too much air is present in a brake line, the air may compress when a brake pedal is depressed, resulting in a lower braking force transferred to one or more brakes than is intended by a driver. Using the methods discussed in these embodiments, a control system may automatically detect a difference between the hydraulic pressure within a braking system and the pressure applied directly at a brake pedal. In particular, in situations where the actual hydraulic pressure in a braking system is lower than the expected hydraulic pressure determined from the pressure applied at the brake pedal due to air in a brake line, the control system discussed above may automatically detect this problem and activate one or more braking countermeasures. In a similar manner, in situations where there is a total loss of hydraulic pressure in the braking system (due to a ruptured brake line, for example), the control system of the current embodiments is capable of detecting this problem by comparing the actual hydraulic pressure with the pressure applied at the braking pedal and employing one or more braking countermeasures. Moreover, it will be understood that the embodiments discussed in this detailed description could be used to detect any braking problems in which the actual braking applied by a braking system is not properly correlated with the pressure applied at a brake pedal (ie, when the actual braking force or pressure is different from the expected braking force or pressure as determined from the pressure applied at the brake pedal).

In embodiments where a control system compares the pedal position with a pressure applied at a brake pedal, the control system may be calibrated to account for normal brake wear and/or softness of fluid. In some cases, for example, normal brake wear can change the relationship between the pedal position and pressure applied at the brake pedal. Likewise, in some cases, differences in fluid compressibility (due to variations in brake fluid, introduction of water and/or air, etc.) can change the relationship between the pedal position and pressure applied at the brake pedal. In some embodiments, it may be useful to vary the predetermined relationship between the pedal position and brake pedal surface pressure over the lifetime of a vehicle or the maintenance cycle of the braking system. For example, in some cases, a control system can automatically adjust the predetermined relationship over time to accommodate expected changes due to brake wear and/or changes in brake fluid composition. In other cases, the predetermined relationship could be modified over the course of a maintenance cycle, so that the predetermined relationship is automatically varied after each instance of brake maintenance. In still other cases, the predetermined relationship could be manually calibrated by a maintenance worker, manufacturer or user.

Figure 13:
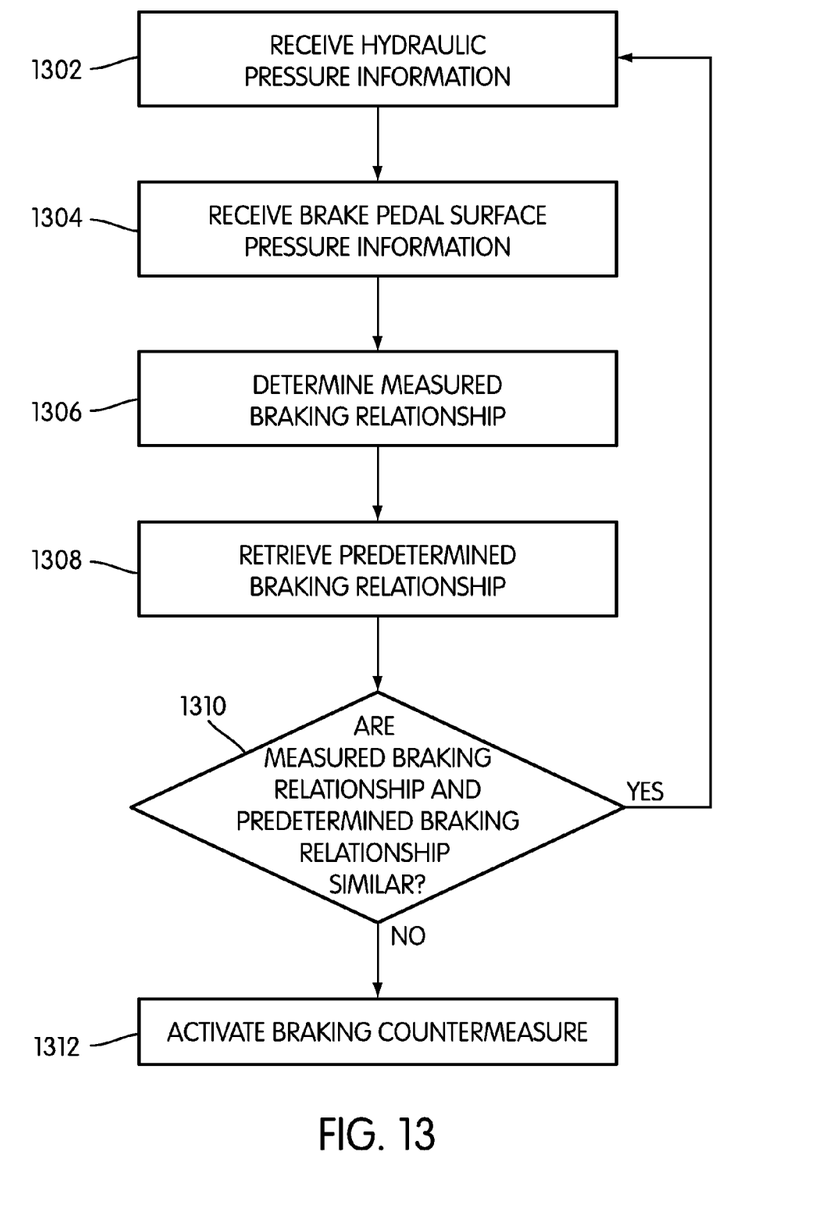
FIG. 13 is an embodiment of a process for controlling a braking control system.

FIG. 13 illustrates an embodiment of a process for controlling braking in a motor vehicle. In some embodiments, some of the following steps could be accomplished by a braking control system of a motor vehicle. In some cases, some of the following steps may be accomplished by an ECU of a motor vehicle. In other embodiments, some of the following steps could be accomplished by other components of a motor vehicle. It will be understood that in other embodiments one or more of the following steps may be optional.

During step 1302, a braking control system may receive hydraulic pressure information. In some cases, the hydraulic pressure information may be received from a pressure sensor associated with one or more components of a braking system. Next, during step 1304, the braking control system may receive brake pedal surface pressure information. In some cases, the pedal surface pressure information may be received from a surface pressure sensor associated with the brake pedal.

Following step 1304, during step 1306, the braking control system may determine a measured braking relationship from the hydraulic pressure information and the pedal surface pressure information. In some cases, during step 1306, the braking control system may match up measured values of hydraulic pressure with measured values of pedal surface pressure, where the matched values occur at the same time. In other words, in some cases, the measured braking relationship may consist of ordered pairs of hydraulic pressure and pedal surface pressure.

Next, during step 1308, the braking control system may retrieve a predetermined braking relationship. The predetermined braking relationship may be received from any component or system including the ECU. In some cases, the predetermined braking relationship may be stored in memory within the ECU. In some cases, the predetermined braking relationship corresponds to ordered pairs of hydraulic pressure and surface pressure.

During step 1310, the braking control system may compare the measured braking relationship and the predetermined braking relationship. In particular, the braking control system may determine if the measured braking relationship and the predetermined braking relationship are substantially similar. This could be determined, for example, by comparing the difference between the measured braking relationship and the predetermined braking relationship with a threshold difference.

If the measured braking relationship is substantially similar to the predetermined braking relationship, the braking control system may return to step 1302. If, however, the measured braking relationship is substantially different from the predetermined braking relationship, the braking control system may proceed to step 1312. During step 1312, the braking control system may activate one or more braking countermeasures. Examples of possible braking countermeasures include, but are not limited to: engine braking, regenerative braking, automatic hydraulic assistance for the braking system, increased brake pad assistance as well as any other countermeasures.

Figure 14:
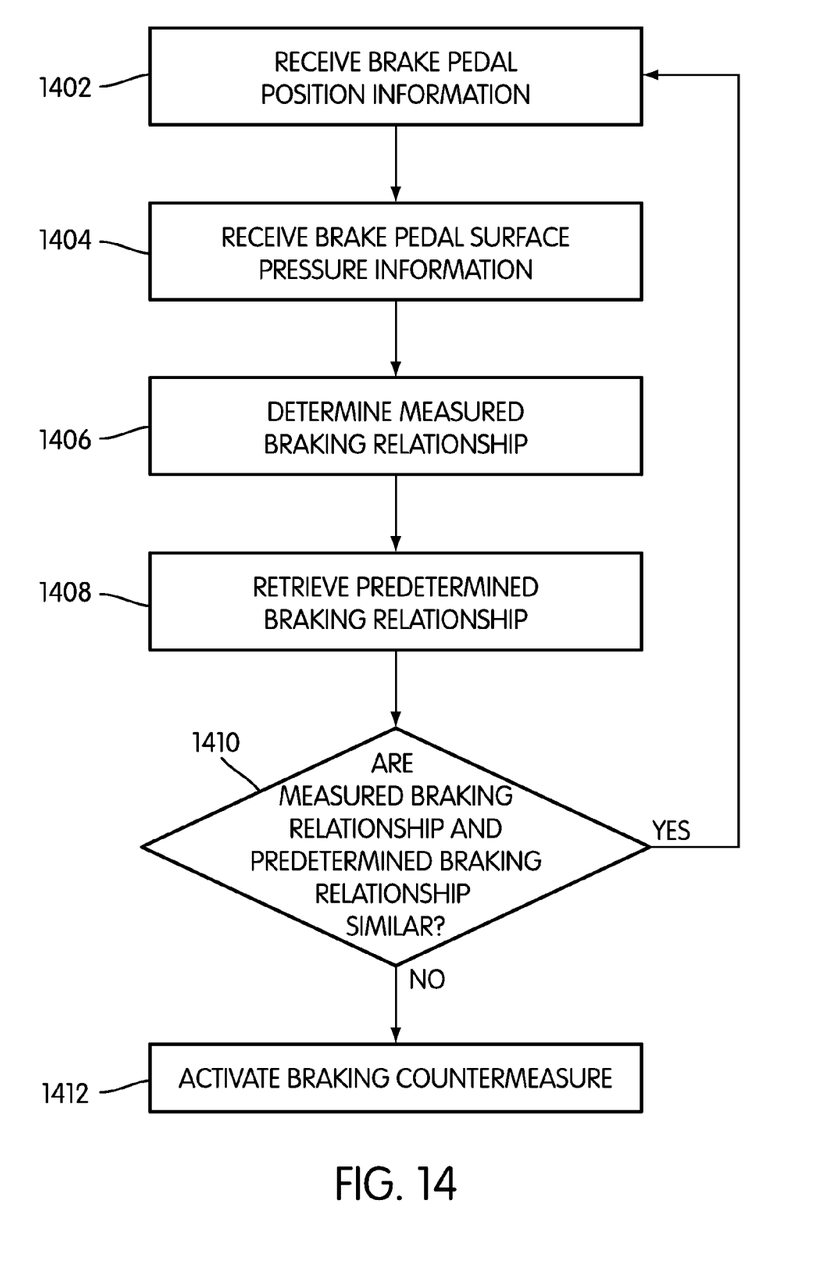
FIG. 14 is an embodiment of a process for controlling a braking control system.

FIG. 14 illustrates an embodiment of a process for controlling braking in a motor vehicle. In some embodiments, some of the following steps could be accomplished by a braking control system of a motor vehicle. In some cases, some of the following steps may be accomplished by an ECU of a motor vehicle. In other embodiments, some of the following steps could be accomplished by other components of a motor vehicle. It will be understood that in other embodiments one or more of the following steps may be optional.

During step 1402, a braking control system may receive brake pedal position information. In some cases, the brake pedal position information can be brake pedal angle information received from a brake pedal angle sensor. For example, the brake pedal position information may be information related to a current angle of the brake pedal as measured from a default angle associated with the released position of the brake pedal. In other cases, the brake pedal position information can be brake pedal travel distance information received from a distance sensor. For example, the brake pedal position information may be information related to a current travel distance of the brake pedal measured from a default brake pedal position associated with the released position.

Next, during step 1404, the braking control system may receive brake pedal surface pressure information. In some cases, the surface pressure information may be received from a surface pressure sensor.

Following step 1404, during step 1406, the braking control system may determine a measured braking relationship from the pedal position information and the surface pressure information. In some cases, during step 1406, the braking control system may match up measured values of pedal position with measured values of surface pressure, where the matched values occur at the same time. In other words, in some cases, the measured braking relationship may consist of ordered pairs of pedal position and pedal surface pressure.

Next, during step 1408, the braking control system may retrieve a predetermined braking relationship. The predetermined braking relationship may be received from any component or system including the ECU. In some cases, the predetermined braking relationship may be stored in memory within the ECU. In some cases, the predetermined braking relationship corresponds to ordered pairs of pedal position and pedal surface pressure.

During step 1410, the braking control system may compare the measured braking relationship and the predetermined braking relationship. In particular, the braking control system may determine if the measured braking relationship and the predetermined braking relationship are substantially similar. This could be determined, for example, by comparing the difference between the measured braking relationship and the predetermined braking relationship with a threshold difference.

If the measured braking relationship is substantially similar to the predetermined braking relationship, the braking control system may return to step 1402. If, however, the measured braking relationship is substantially different from the predetermined braking relationship, the braking control system may proceed to step 1412. During step 1412, the braking control system may activate one or more braking countermeasures. Examples of possible braking countermeasures include, but are not limited to: engine braking, regenerative braking, automatic hydraulic assistance for the braking system, increased brake pad assistance as well as any other countermeasures.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of controlling braking in a motor vehicle, comprising:
   receiving information related to the hydraulic pressure of a braking system;
   receiving information related to the pressure applied to a surface of a brake pedal;
   determining a measured braking relationship between the hydraulic pressure of the braking system and the pressure applied to the surface of the brake pedal;
   retrieving a predetermined braking relationship, wherein the predetermined braking relationship comprises a predetermined correlation between the hydraulic pressure of the braking system and the pressure applied to the surface of the brake pedal;
   comparing the measured braking relationship and predetermined braking relationship; and
   activating a braking countermeasure when the measured braking relationship is substantially different from the predetermined braking relationship, the braking countermeasure being configured to reduce a speed of the motor vehicle.

2. The method according to claim 1, wherein the braking countermeasure is engine braking.

3. The method according to claim 2, wherein the engine braking includes automatically downshifting a transmission.

4. The method according to claim 1, wherein the braking countermeasure is regenerative braking.

5. The method according to claim 1, wherein the braking countermeasure is additional hydraulic assistance to the braking system.

6. The method according to claim 1, wherein the braking countermeasure is brake pad assistance.

7. The method according to claim 1, wherein the predetermined braking relationship is approximately linear.

8. A method of controlling braking in a motor vehicle, comprising:
   receiving information related to the position of a brake pedal;

receiving information related to the pressure applied to a surface of the brake pedal;

determining a measured braking relationship between the position of the brake pedal and the pressure applied to the surface of the brake pedal;

retrieving a predetermined braking relationship, wherein the predetermined braking relationship comprises a predetermined correlation between the position of the brake pedal and the pressure applied to the surface of the brake pedal;

comparing the measured braking relationship and predetermined braking relationship; and activating a braking countermeasure when the measured braking relationship is substantially different from the predetermined braking relationship, the braking countermeasure being configured to reduce a speed of the motor vehicle.

9. The method according to claim 8, wherein the predetermined braking relationship is substantially nonlinear.

10. The method according to claim 8, wherein the pedal position is a pedal travel distance.

11. The method according to claim 8, wherein the pedal position is a pedal angle.

12. The method according to claim 8, wherein the braking countermeasure is engine braking.

13. The method according to claim 8, wherein the braking countermeasure is regenerative braking.

14. The method according to claim 8, wherein the braking countermeasure is hydraulic assist.

15. The method according to claim 8, wherein the braking countermeasure is brake pad assist.

16. A method of controlling a braking system in a motor vehicle, comprising:

sensing a pressure applied to a brake pedal surface;

receiving information related to the amount of braking force applied by a braking system;

determining if the pressure applied to the brake pedal surface agrees with the amount of braking force applied by the braking system; and applying a braking countermeasure if the pressure applied to the brake pedal does not agree with the amount of braking force applied by the braking system.

17. The method according to claim 16, wherein the pressure is sensed using a piezoelectric sensor.

18. The method according to claim 16, wherein the pressure is sensed using a strain gauge.

19. The method according to claim 16, wherein the braking countermeasure is configured to provide an additional braking force independently from the braking system.

20. The method according to claim 16, wherein the braking countermeasure is configured to enhance the operation of the braking system.

21. The method according to claim 16, wherein determining if the pressure applied to the brake pedal surface agrees with the amount of braking force applied by the braking system includes retrieving a predetermined relationship between brake pedal surface pressure and brake pedal position.

22. The method according to claim 21, wherein the predetermined relationship is calibrated for brake wear.

23. The method according to claim 21, wherein the predetermined relationship is calibrated for air and/or fluid in a brake line.

* * * * *